US009140870B2

(12) United States Patent
Marmon et al.

(10) Patent No.: US 9,140,870 B2
(45) Date of Patent: Sep. 22, 2015

(54) RETAINER TAB ASSEMBLIES AND SLACK BASKET SYSTEMS, FIBER OPTIC ENCLOSURES AND METHODS INCLUDING THE SAME

(75) Inventors: Thomas Ross Marmon, Angier, NC (US); Roy Keller Thompson, Apex, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/404,988

(22) Filed: Feb. 24, 2012

(65) Prior Publication Data

US 2012/0230645 A1   Sep. 13, 2012

Related U.S. Application Data

(60) Provisional application No. 61/449,965, filed on Mar. 7, 2011.

(51) Int. Cl.
*G02B 6/00* (2006.01)
*G02B 6/44* (2006.01)

(52) U.S. Cl.
CPC ............ *G02B 6/4447* (2013.01); *G02B 6/4454* (2013.01); *G02B 6/4452* (2013.01); *G02B 6/4455* (2013.01)

(58) Field of Classification Search
CPC .. G02B 6/4452; G02B 6/4453; G02B 6/4471; G02B 6/4455; G02B 6/4454; G02B 6/4446; G02B 6/444; G02B 6/3676
USPC ......................................... 385/135–137, 147
See application file for complete search history.

(56) References Cited

U.S. PATENT DOCUMENTS

| 5,428,705 A | * | 6/1995 | Hermsen et al. ............... 385/135 |
| 5,515,472 A | * | 5/1996 | Mullaney et al. .............. 385/135 |
| 5,631,993 A | * | 5/1997 | Cloud et al. ................... 385/135 |
| 5,724,469 A | | 3/1998 | Orlando |
| 5,884,002 A | | 3/1999 | Cloud et al. |

(Continued)

FOREIGN PATENT DOCUMENTS

WO   WO 2010/036549 A1   4/2010

OTHER PUBLICATIONS

Notification of Transmittal of the International Search Report and the Written Opinion of the International Searching Authority, or the Declaration in corresponding PCT Application No. PCT/US2012/026523 mailed Jun. 18, 2012 (13 pages).
"FOSC 450 Gel-Sealed Fiber Optic Splice Closure Ordering Guide" Tyco Electronics Corporation, © 2004-2009 1654571 F429.11/09 (32 pages).
"FOSC 600 C and D Fiber Optic Splice Closure Installation Instruction" Tyco Electronics Corporation, © 2003, 2008 PML MP0310 F392.04/08 (15 pages).

(Continued)

*Primary Examiner* — Kaveh Kianni
*Assistant Examiner* — Hung Lam
(74) *Attorney, Agent, or Firm* — Merchant & Gould P.C.

(57) ABSTRACT

A multi-drop closure system for containing and managing a bundle of optical fibers includes an enclosure and a slack basket system. The enclosure defines a slack basket chamber to hold the bundle of optical fibers. The slack basket system includes a retainer tab assembly mounted in the enclosure. The retainer tab assembly includes a tab member movable between: an open position, wherein the tab member is positioned to provide more open access to the slack basket chamber and thereby enable the bundle of optical fibers to be more easily inserted into, removed from, and/or manipulated in the slack basket chamber; and a retaining position, wherein the tab member overlaps the slack basket chamber to retain the bundle of optical fibers in the slack basket chamber.

11 Claims, 12 Drawing Sheets

(56) References Cited

U.S. PATENT DOCUMENTS

| | | | |
|---|---|---|---|
| 6,396,989 B1* | 5/2002 | Johnston et al. | 385/134 |
| 2004/0001686 A1* | 1/2004 | Smith et al. | 385/135 |
| 2006/0193587 A1 | 8/2006 | Wittmeier et al. | |
| 2009/0185782 A1 | 7/2009 | Parikh et al. | |
| 2011/0058784 A1* | 3/2011 | Puetz et al. | 385/135 |

OTHER PUBLICATIONS

"FOSC 600 Fiber Optic Splice Closure" Tyco Electronics Corporation, © 2005, 2008 F382.06/08 (2 pages).

International Preliminary Report on Patentability corresponding to International application No. PCT/US2012/026523; Date of Mailing: Sep. 19, 2013, 8 pages.

* cited by examiner

RETAINER TAB ASSEMBLIES AND SLACK BASKET SYSTEMS, FIBER OPTIC ENCLOSURES AND METHODS INCLUDING THE SAME

RELATED APPLICATION(S)

The present application claims the benefit of and priority from U.S. Provisional Patent Application No. 61/449,965, filed Mar. 7, 2011, the disclosure of which is hereby incorporated herein by reference in its entirety.

FIELD OF THE INVENTION

The present invention relates to communication cable termination systems and, more particularly, to optical fiber termination systems and methods for storing and terminating the same.

BACKGROUND OF THE INVENTION

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location, for example. A trunk or main cable may be routed, for example, through a housing subdivision and small fiber count branch or drop cables may be spliced to the main cable at predetermined spaced apart locations.

A typical main cable may be installed underground and have multiple drop cables connected thereto, each of fifty feet or more. Each of the drop cables, in turn, may be routed to an optical network unit (ONU) serving several homes. Information may then be transmitted optically to the ONU, and into the home via conventional copper cable technology, or optically via optical fibers extending all the way to the home. Alternatively, the drop cables may be routed directly to the house (ONT). Thus, the drop cables may serve groups of users, although other architectures may also employ a main cable and one or more drop cables connected thereto.

SUMMARY OF THE INVENTION

Figure 1:
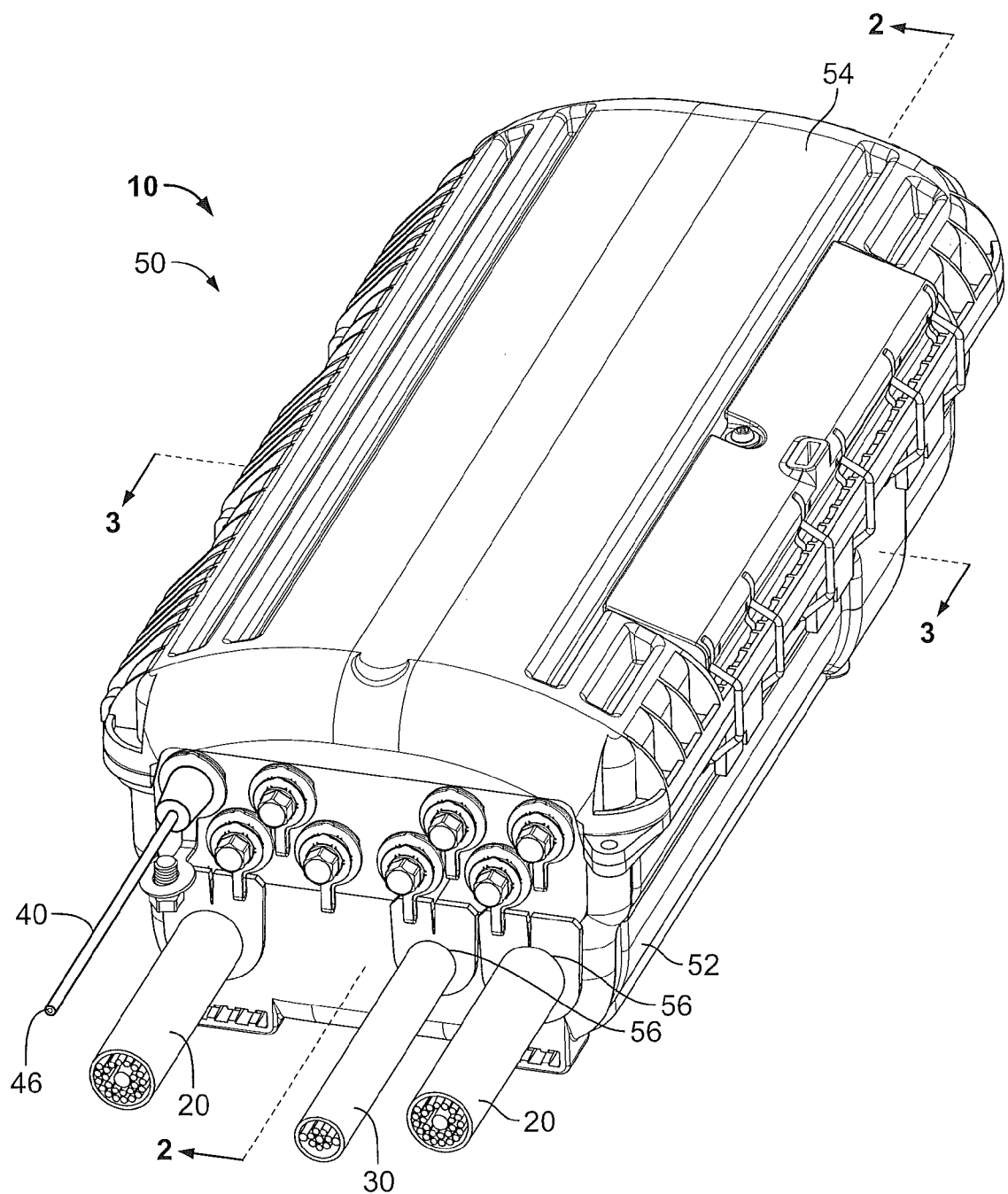
FIG. 1 is a perspective view of a multi-drop closure system according to embodiments of the present invention.

According to embodiments of the present invention, a multi-drop closure system for containing and managing a bundle of optical fibers includes an enclosure and a slack basket system. The enclosure defines a slack basket chamber to hold the bundle of optical fibers. The slack basket system includes a retainer tab assembly mounted in the enclosure. The retainer tab assembly includes a tab member movable between: an open position, wherein the tab member is positioned to provide more open access to the slack basket chamber and thereby enable the bundle of optical fibers to be more easily inserted into, removed from, and/or manipulated in the slack basket chamber; and a retaining position, wherein the tab member overlaps the slack basket chamber to retain the bundle of optical fibers in the slack basket chamber.

According to further embodiments of the present invention, a slack basket system for retaining a bundle of optical fibers in an enclosure includes a retainer tab assembly. The retainer tab assembly includes a tab member movable between: an open position, wherein the tab member is positioned to provide more open access to the slack basket chamber and thereby enable the bundle of optical fibers to be more easily inserted into, removed from, and/or manipulated in the slack basket chamber; and a retaining position, wherein the tab member overlaps the slack basket chamber to retain the bundle of optical fibers in the slack basket chamber.

According to method embodiments of the present invention, a method for containing and managing a bundle of optical fibers includes providing a multi-drop closure system. The multi-drop closure system includes an enclosure and a slack basket system. The enclosure defines a slack basket chamber to hold the bundle of optical fibers. The slack basket system includes a retainer tab assembly mounted in the enclosure. The retainer tab assembly includes a tab member movable between: an open position, wherein the tab member is positioned to provide more open access to the slack basket chamber and thereby enable the bundle of optical fibers to be more easily inserted into, removed from, and/or manipulated in the slack basket chamber; and a retaining position, wherein the tab member overlaps the slack basket chamber to retain the bundle of optical fibers in the slack basket chamber. The method further includes: with the tab member in the open position, placing the bundle of optical fibers in the slack basket chamber; and thereafter moving the tab member into the retaining position to hold the bundle of optical fibers in the slack basket chamber.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Some embodiments of the present invention provide an enclosure system for use with fiber optic cabling. The enclosure system may make it easier to access and splice fibers running to living units or other customer locations at or near the end of fiber runs.

In some embodiments, the enclosure system includes an enclosure including some and/or all of the following features. The enclosure system may include an enclosure containing entry and/or egress points for fiber optic cables. One entry point may be used for an entering cable (feeder), one or more entry points may be used for branch and/or drop cable(s) exit, and a third may be used for exiting feeder (express) cable. The enclosure system may be a multi-drop or tap-off closure.

According to some embodiments of the present invention, a pass through fiber optic closure is provided. The closure is configured to receive a segment of a fiber optic cable, such that fibers thereof are expressed (uncut) through the closure without severing a buffer tube or tubes of the cable segment (i.e., one or more of the buffer tubes are expressed through the closure). According to some embodiments of the present invention, an outer protective buffer tube of the cable segment extends fully and continuously through the closure.

According to embodiments of the present invention, one or more retainer tab assemblies are provided to form a fiber optic slack basket for storing fiber buffer tubes or ribbon fiber, for example. Each slack basket retainer tab assembly includes a displaceable tab portion that can be moved to an open position to allow more open access to a slack basket area in the bottom of enclosure. In the open position, the tab portion does not obstruct or presents a reduced obstruction, thereby making organizing the fiber buffer tubes or ribbons easier. After the fiber buffer tubes or ribbons are arranged or coiled in the slack basket area, the tab portion can be returned to a retaining position to secure the fiber buffer tubes or ribbons in the bottom of the slack basket, thereby forming a top portion of the slack basket. Embodiments of the present invention can thereby allow for unobstructed arrangement of fiber-optic buffer tubes or ribbons into a slack storage basket. This makes the organization or coiling of the buffer tubes or ribbons easier for a craftsperson to accomplish.

According to some embodiments, the tab portion is removable and replaceable on the enclosure to enable an operator to place the tab portion in each of the open position (by removing the tab portion from the enclosure) or the retaining position (by replacing the tab portion on the enclosure). According to some embodiments, the tab portion is removable and replaceable on a base forming a part of the retainer tab assembly, and the base is in turn secured to the enclosure.

According to some embodiments, the tab portion is hingedly coupled to the enclosure to enable an operator to place the tab portion in each of the open position (by pivoting the tab portion up relative to the enclosure) or the retaining position (by pivoting the tab portion down relative to the enclosure). According to some embodiments, the tab portion is hingedly mounted on a base forming a part of the retainer tab assembly, and the base is in turn secured to the enclosure.

Figure 2:
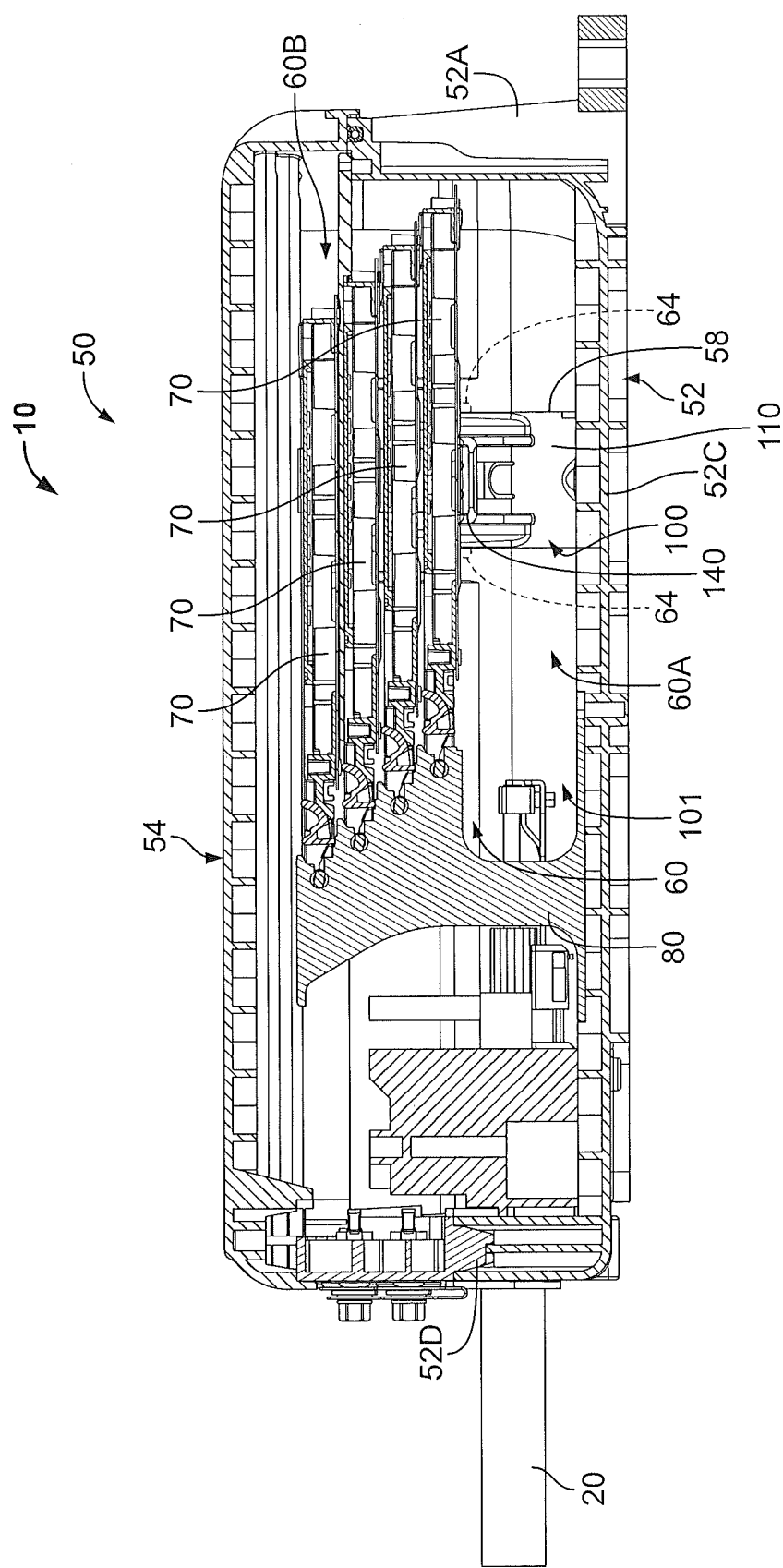
FIG. 2 is a cross-sectional view of multi-drop closure system of FIG. 1 taken along the line 2-2 of FIG. 1.
Figure 3:
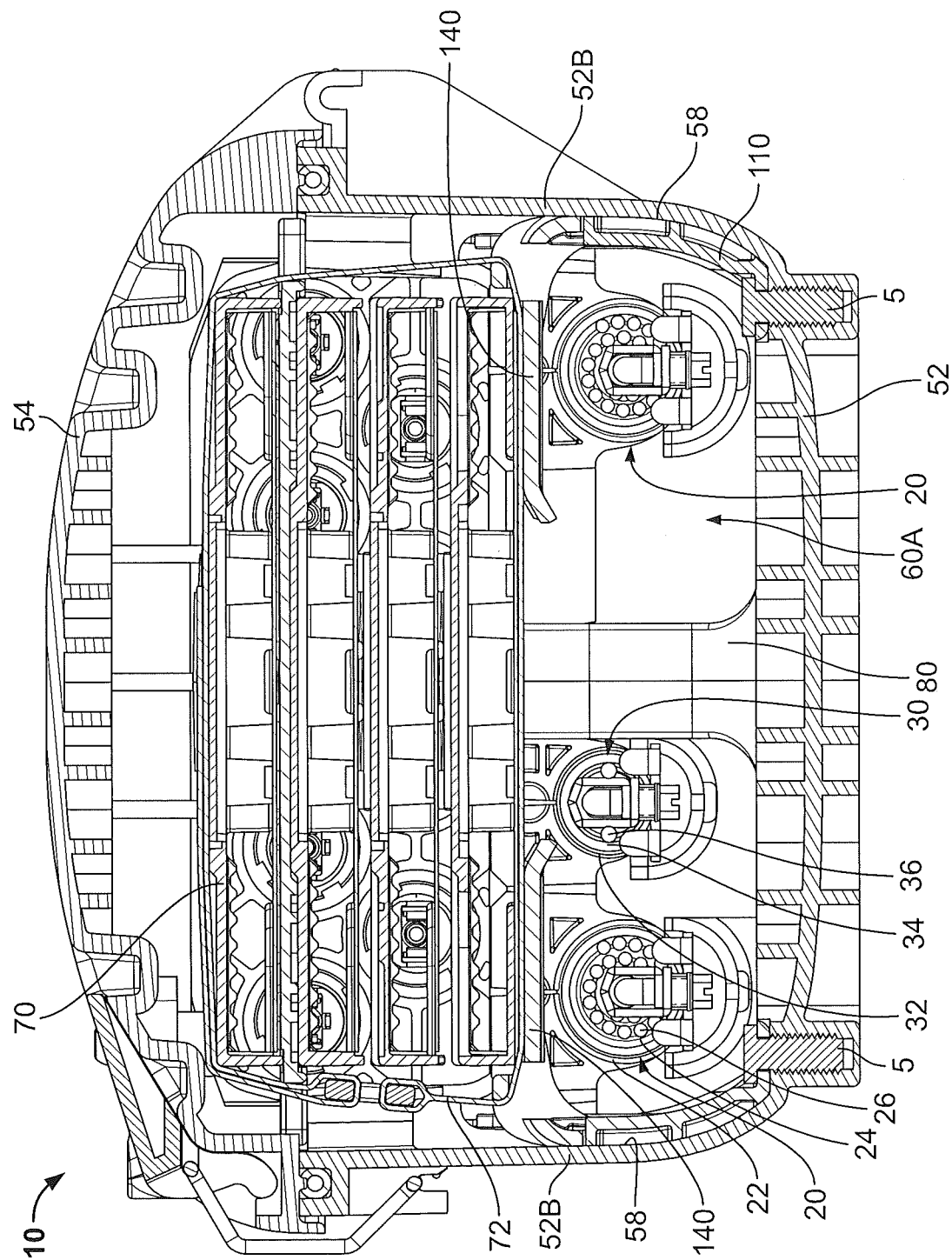
FIG. 3 is a cross-sectional view of multi-drop closure system of FIG. 1 taken along the line 3-3 of FIG. 1.

Embodiments of the present invention will now be further described with reference to FIGS. 1-11. A multi-drop enclosure system 10 for coupling an optical fiber branch cable 30 and/or optical fiber drop cables 40 to an optical fiber main cable 20 at a termination point to form a splice connection assembly is shown in FIGS. 1-3. The optical fiber main cable 20 may be, for example, a feed from a service provider central office intended to provide service to individual subscriber locations in various locations in the field. The termination point may be positioned in the proximity of a neighborhood or the like and the branch and drop cables 30, 40 may deliver an optical fiber connection to the subscriber location and/or to a junction box or the like where, for example, a copper connection may be routed for the last leg to the subscriber location. Alternatively, drop cables 40 may be routed directly from the enclosure system 10 to the subscriber location (e.g., house).

The portion of the cable 20 shown in the figures corresponds to a termination point, where a splice may be made to the main cable 20, and it will be understood that there are typically branch and drop cables spliced to the main cable 20 at a plurality of longitudinally displaced termination points selected to be positioned at desired locations in the field, such as in a neighborhood or the like.

Figure 8:
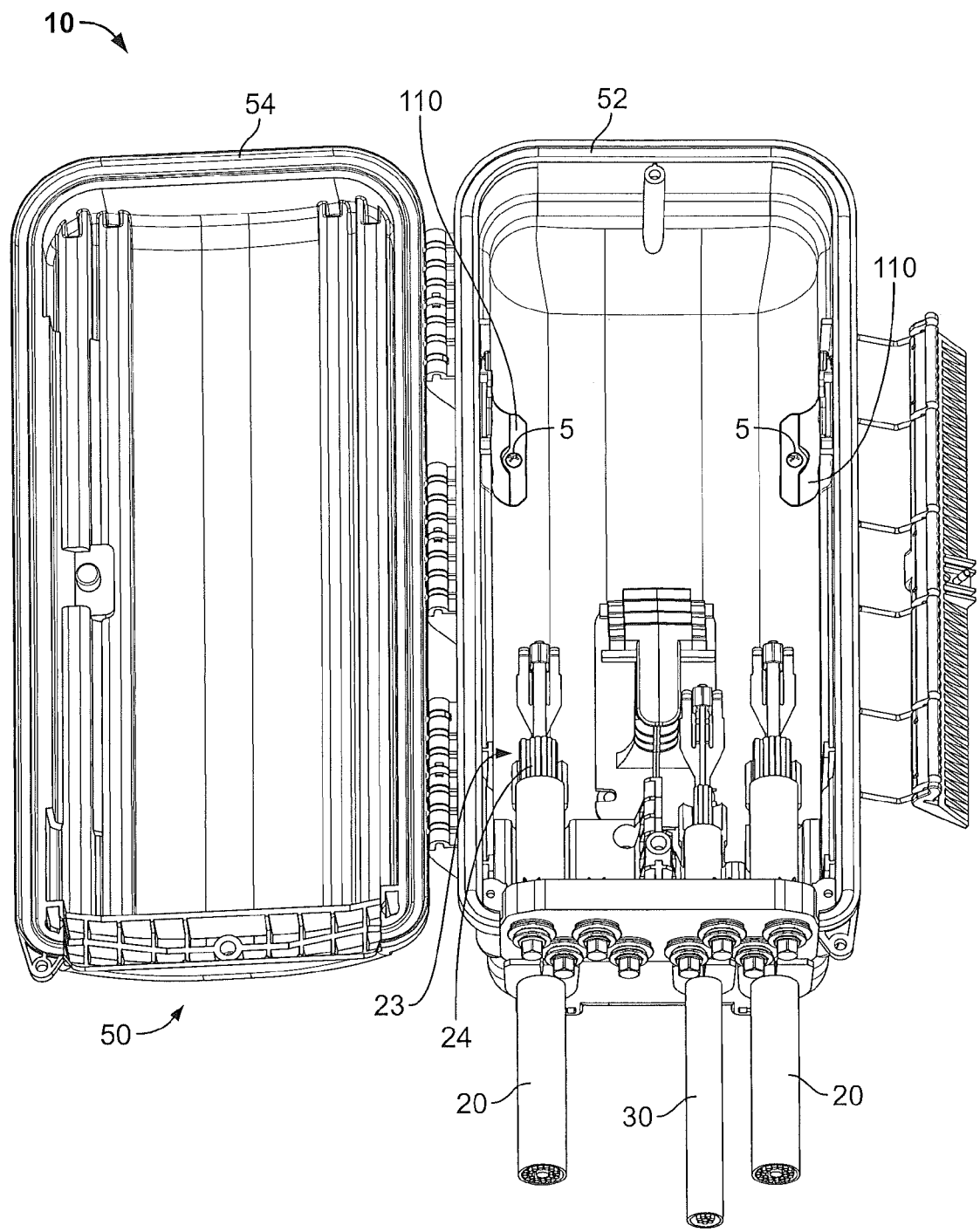
FIGS. 8-11 are top perspective views of the multi-drop closure system of FIG. 1 illustrating methods for using the multi-drop closure system.

In FIGS. 2, 3 and 8, portions of the cables 20, 30 in the enclosure 50 are omitted for the purpose of explanation.

With reference to FIG. 3, the illustrated optical fiber main cable 20 includes a cable jacket 22 surrounding a plurality or bundle of buffer tubes 24, and one or more optical fibers 26 extending through each buffer tube 24. The cable 20 may include further components such as a tubular metal grounding shield, or one or more strength members. According to other embodiments, the cable 20 may include one or more fiber optic ribbons surrounded by a jacket. It will be appreciated that the description herein regarding routing, placement and organizing of the buffer tubes 24 likewise applies to fiber optic ribbons. However, in the case of a fiber optic ribbon cable, the buffer tube thereof typically will be severed to expose all of the ribbons rather than expressed through the enclosure.

Referring to FIG. 3, each branch cable 30 may include an outer jacket 32, one or more buffer tubes 34 extending longitudinally through the outer jacket 32, and one or more optical fibers 36 (typically, a plurality of fibers, e.g., seventy-two) extending through the buffer tubes 34. The fibers 36 may be grouped in respective buffer tubes 34. For example, in a seventy-two fiber cable 30, there may be six buffer tubes 34 with twelve fibers 36 in each buffer tube 34. According to other embodiments, the cable 30 may include one or more fiber optic ribbons surrounded by a jacket and a buffer tube. It will be appreciated that the description herein regarding routing, placement and organizing of the buffer tubes 34 likewise applies to fiber optic ribbons.

Each drop cable 40 (FIG. 1) may likewise include an outer jacket, a buffer tube extending through the outer jacket, and one or more optical fibers 46 extending through the buffer tube.

The fiber optic enclosure system 10 includes an enclosure 50, one or more splice trays 70, a tray tower 80, a strap 72 (FIGS. 3, 7 and 11), and a slack basket system 101.

The enclosure 50 includes a base 52 and a lid or cover 54. The base 52 and the cover 54 collectively define an enclosure chamber 60. As discussed in more detail below, the slack basket system 101 partitions chamber 60 into a slack storage basket subchamber 60A (hereinafter, the slack basket subchamber 60A) and a splice tray subchamber 60B. The base 52 includes a floor 52C, opposed end walls 52A and 52D, and opposed sidewalls 52B. Cable ports 56 (FIG. 6) are defined in the end wall 52D. Recesses 58 (FIG. 3) and anchor slots 64 are defined in the sidewalls 52B. Clamps may be secured to the base 52 to secure the cables 20, 30.

The cover 54 can be moved between an open position allowing access for splicing optical fibers in the chamber 60 and a closed position extending over an access opening to the chamber 60 defined by the base 52. In the closed position, the interface between the base 52 and the cover 54 may be environmentally sealed so as to allow repeated access to the chamber 60 while maintaining an environmentally sealed space for splices when the cover 54 is in the closed position. The cover 54 can be secured in the closed position by clamps, latches, straps or any other suitable mechanisms.

The slack basket system 101 includes a pair of opposed retainer tab assemblies 100, the tray tower 80, and the base 52. These components collectively define the basket subchamber 60A. While two retainer tab assemblies 100 are shown and described, as few as one retainer tab assembly 100 or three or more retainer tab assemblies 100 may be employed in accordance with other embodiments of the present invention.

Figure 4:
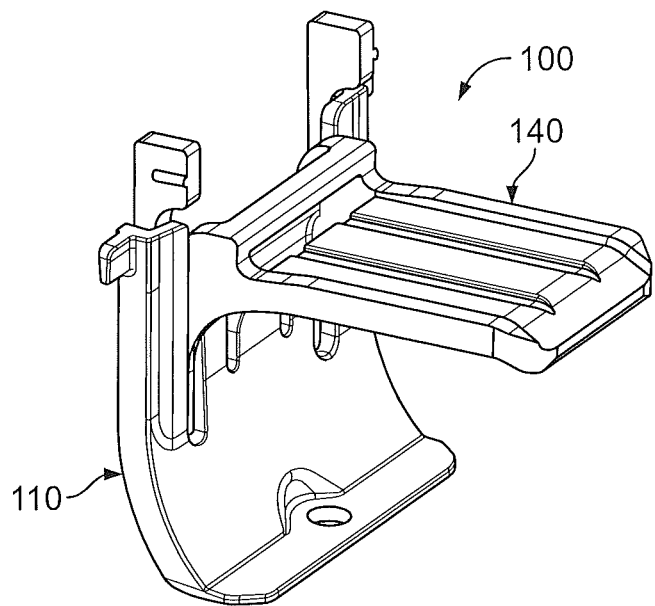
FIG. 4 is a front perspective view of a retainer tab assembly forming a part of the multi-drop closure system of FIG. 1.
Figure 5:
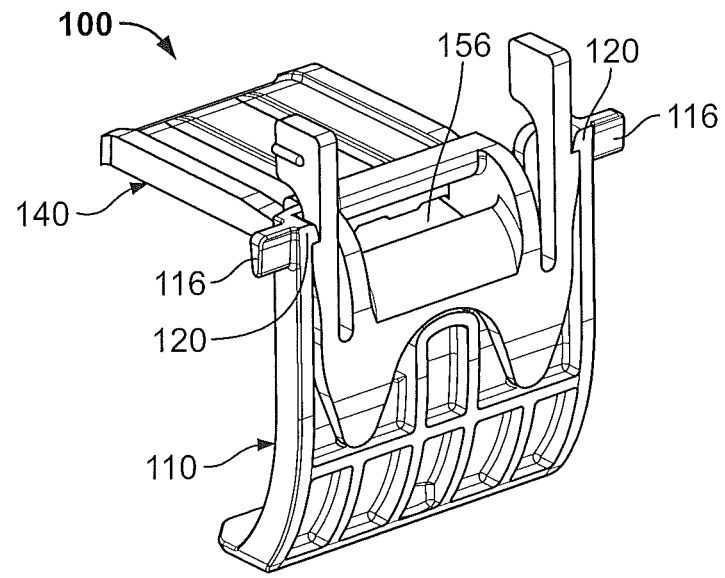
FIG. 5 is a rear perspective view of the retainer tab assembly of FIG. 4.
Figure 6:
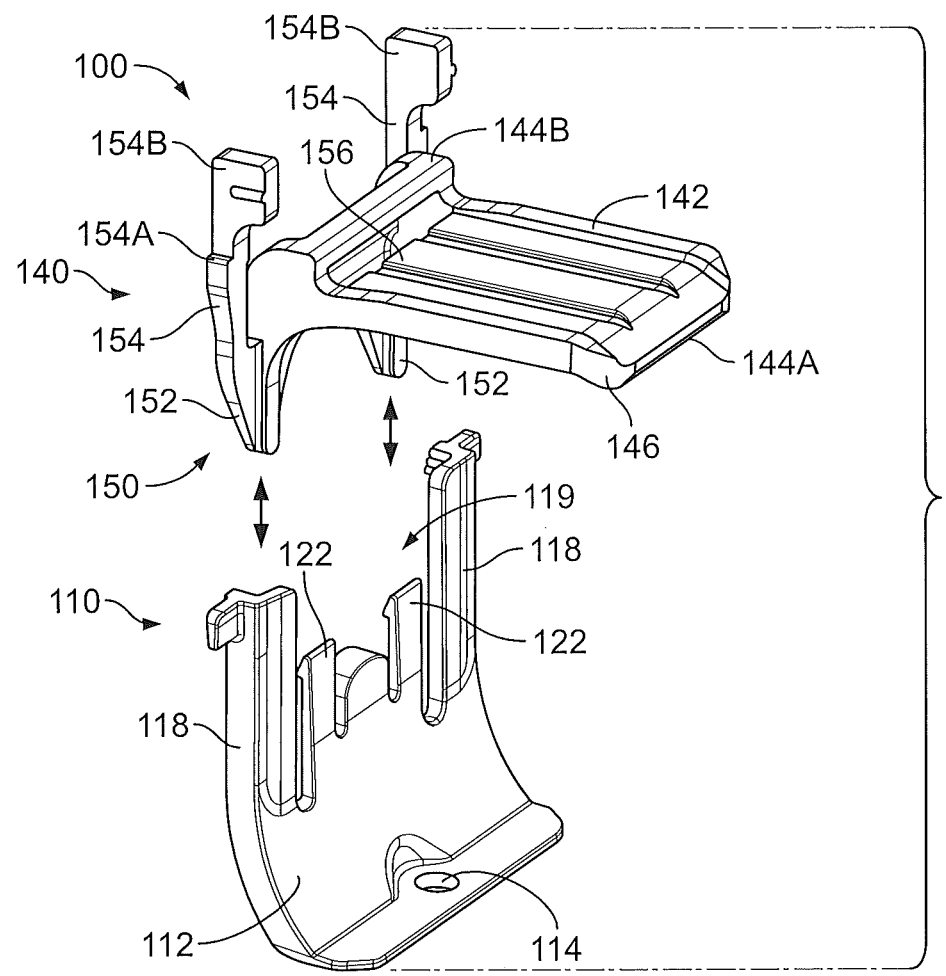
FIG. 6 is an exploded, front perspective view of the retainer tab assembly of FIG. 4.
Figure 7:
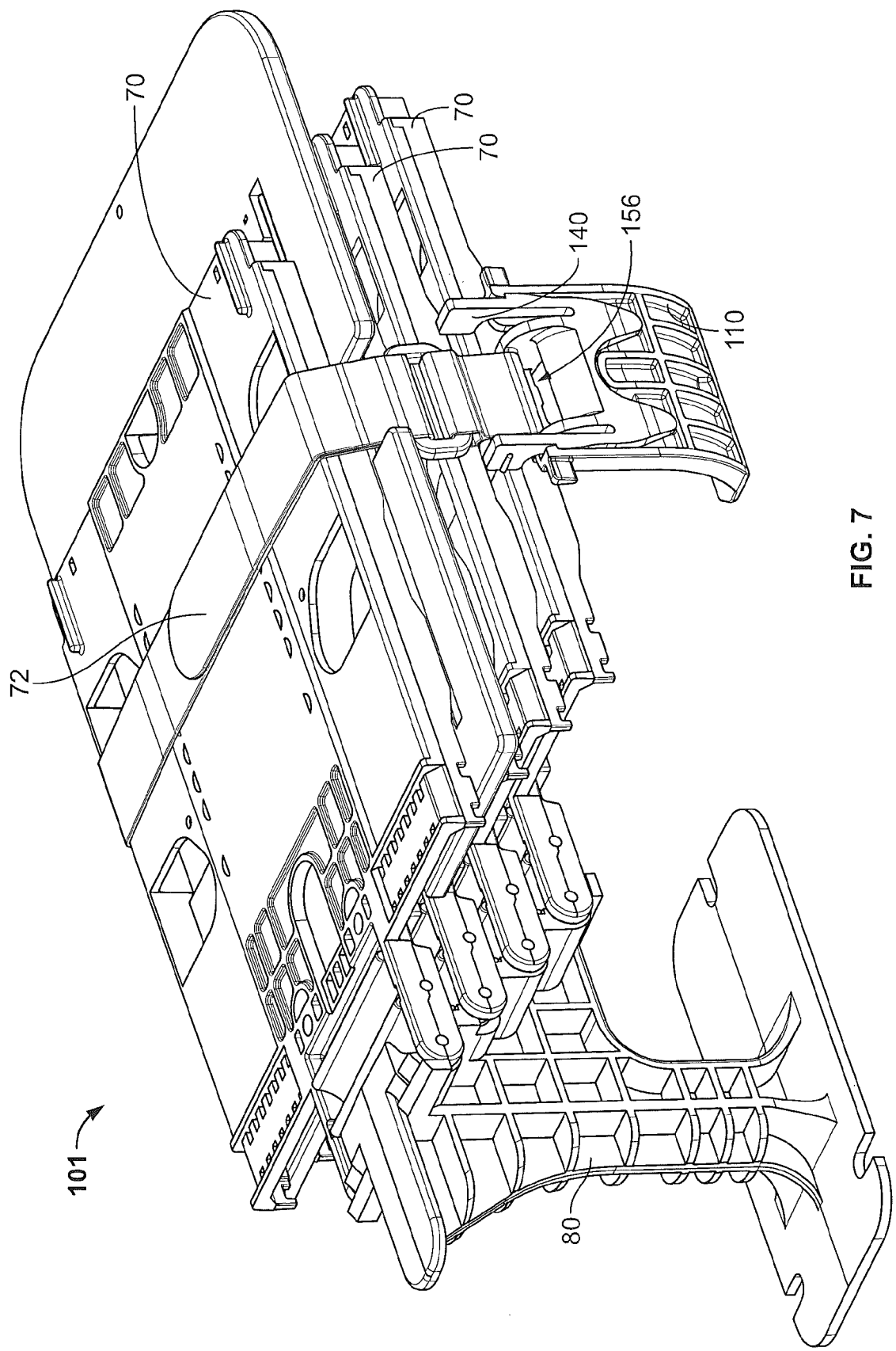
FIG. 7 is a fragmentary, perspective view of the multi-drop closure system of FIG. 1.

With reference to FIGS. 4-6, each tab assembly 100 includes a tab base 110 and a tab member 140. The base 110 includes a body 112. A screw hole 114 is provided in a lower end of the body 112. A pair of mount arms 118 extend upwardly from the body 112 and define a mount slot 119 therebetween on the back side of the body 112. A pair of opposed anchor tabs 116 extend outwardly from the upper ends of the arms 118. Latch features 120 are provided on the upper ends of the arms 118. Stabilizer arms 122 also extend upwardly from the base 112 between the mount arms 118.

The tab member 140 includes a body 142 having a free end 144A and a mounting end 144B. An elongate, protruding lip 146 is provided on the free end 144A. The mount structure 150 is provided on the mounting end 144B. The mounting structure 150 includes a pair of opposed insert arms 152 and a pair of opposed latch arms 154. Each latch arm 154 includes a latch feature 154A and a release tab 154B. A strap slot 156 is provided in the tab member 140 adjacent the mounting end 144B.

The base 110 and the tab member 140 may be formed of any suitable rigid or semi-rigid material. According to some embodiments, the base 110 and the tab member 140 are formed of a polymeric material. According to some embodiments, the base 110 and the tab member 140 are formed of a polymeric material selected from the group consisting of polypropylene, polyethylene, nylon, ABS and PMMA. According to some embodiments, the base 110 and the tab member 140 are each unitarily molded and, according to some embodiments, are each unitarily injection molded.

The enclosure system 10 may be assembled as follows in accordance with embodiments of the invention. The enclosure 50, the tray tower 80 and the splice tray 70 may be assembled in known or other suitable manner. For example, the splice tray 70 can be pivotally mounted on the tray tower 80 to cantilever therefrom. The bases 110 are each inserted into a respective one of the recesses 58 such that the anchor tabs 116 interlock with the adjacent anchor slots 64. Each base 110 is then secured in place by a self-tapping screw 5 inserted through the screw hole 114.

Each tab member 140 may be mounted in its corresponding base 110, or the installation of the tab members 140 may be postponed until an installer wishes to form and use a slack basket. In order to mount a tab member 140 in its base 110, the insert arms 152 are pushed down into the mount slot 119 until the latch features 154A interlock with the latch features 120 as shown in FIGS. 4 and 5. The tab member 140 is thereby secured against removal. Additionally, the stabilizer arms 122 may apply a spring load against the tab member 140 to inhibit vibration or rattling of the tab member 140.

Figure 9:
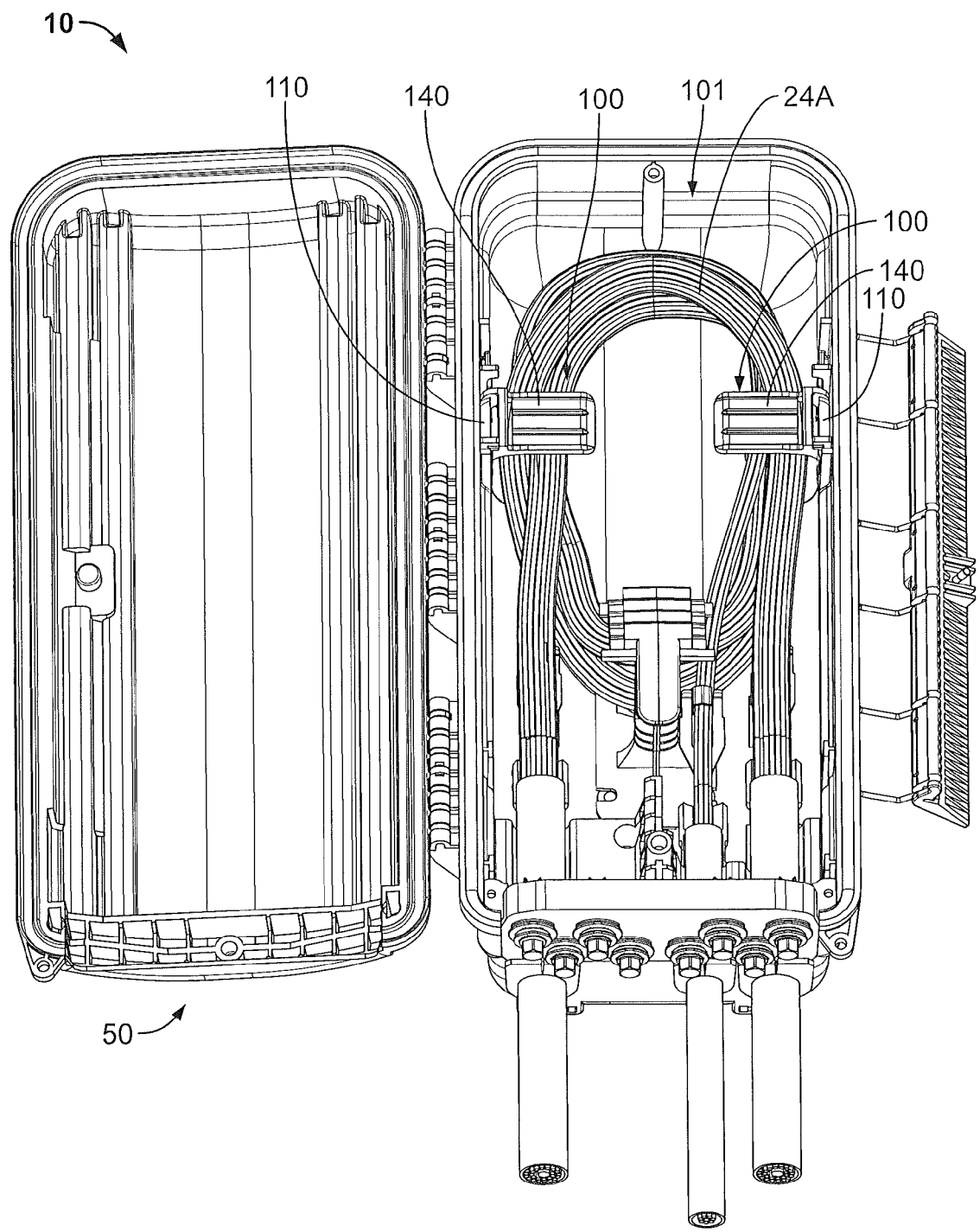

In use, a length of the main cable 20 can be routed into the chamber 60 and coiled as illustrated in FIG. 9, for example. Typically, a section of the jacket 22 is removed to expose a bundle 23 of buffer tubes (or ribbons) 24 containing optical fibers. In FIG. 8, only a portion of each cable 20, 30 within the enclosure 50 is shown for the purpose of explanation. Commonly, the installer will wish to store an excess of length or slack of the bundle 23 in the enclosure 50 for later use or convenience in making splices or otherwise managing the fibers within the enclosure 50. The installer can use the slack basket system 101 to store this excess length.

More particularly, the tab members 140, if installed in the bases 110, are removed from the bases 110 into an open position as shown in FIG. 8. Removal of each tab member 140 is accomplished by pulling (e.g., using one's thumb and finger) the two latch arms 154 together to release the latch features 154A from the latch features 120, and then withdrawing the tab member 140 from the base 110. In this way, access to the slack basket subchamber 60A is improved by providing greater clearance into the subchamber 60A from above.

The excess length or slack of the buffer tubes 24 is wound or coiled (e.g., spirally and/or in a figure-8 configuration) as shown in FIG. 9 and placed in the slack basket subchamber 60A. The coiled bundle 24A of buffer tubes 24 may be laterally constrained by the end wall 52D, the side walls 52A, 52B, the bases 110, and the tray tower 80.

The installer then inserts each tab member 140 into its respective base 110 to assume a retaining position as shown in FIGS. 2, 3 and 9. The tab members 140 are cantilevered from the bases 110 and extend into the chamber 60 to overlap the coiled bundle 24A of buffer tubes 24. The coiled bundle 24A is thereby vertically constrained by the tab members 140 and the slack basket is completed.

Figure 10:
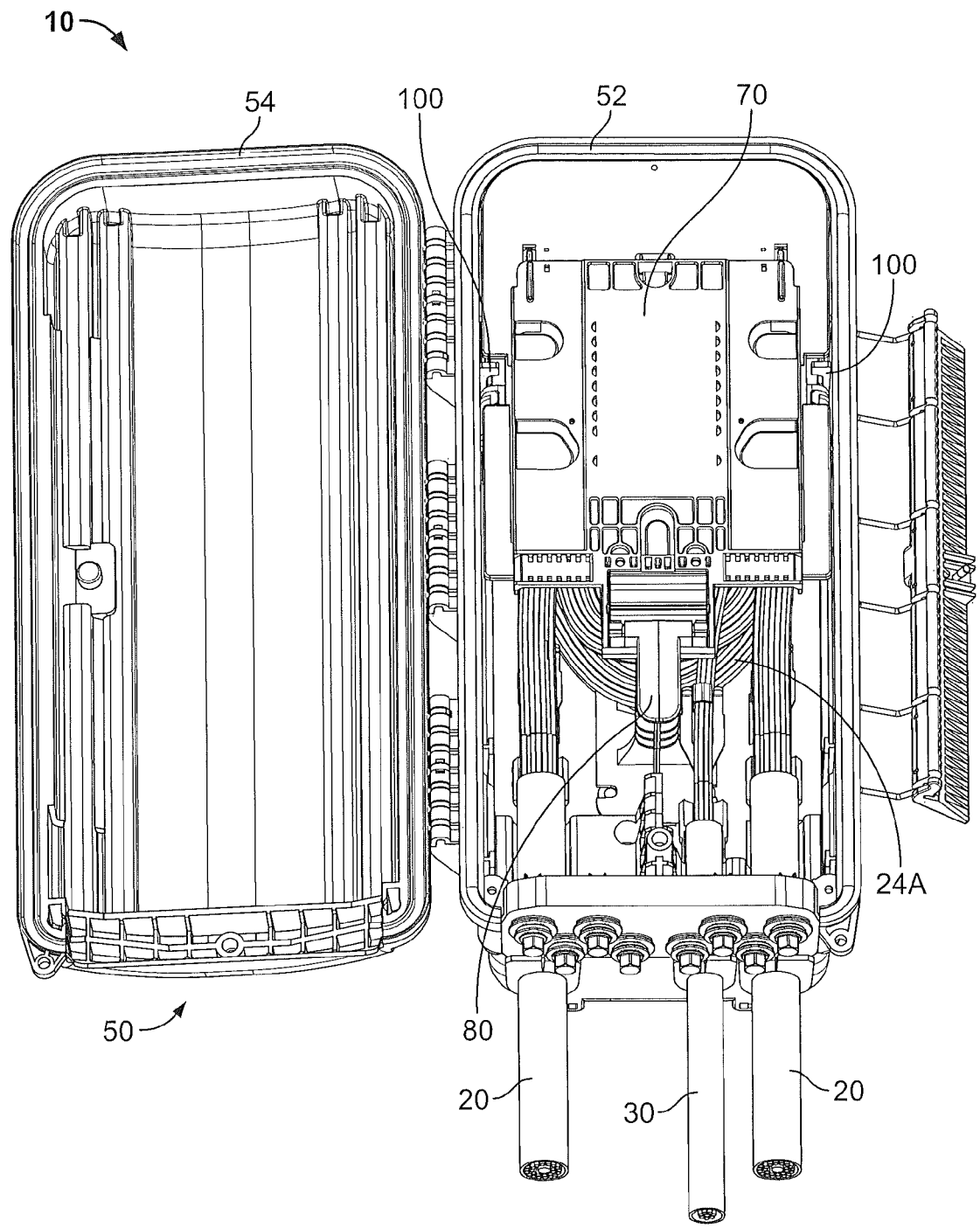
Figure 11:
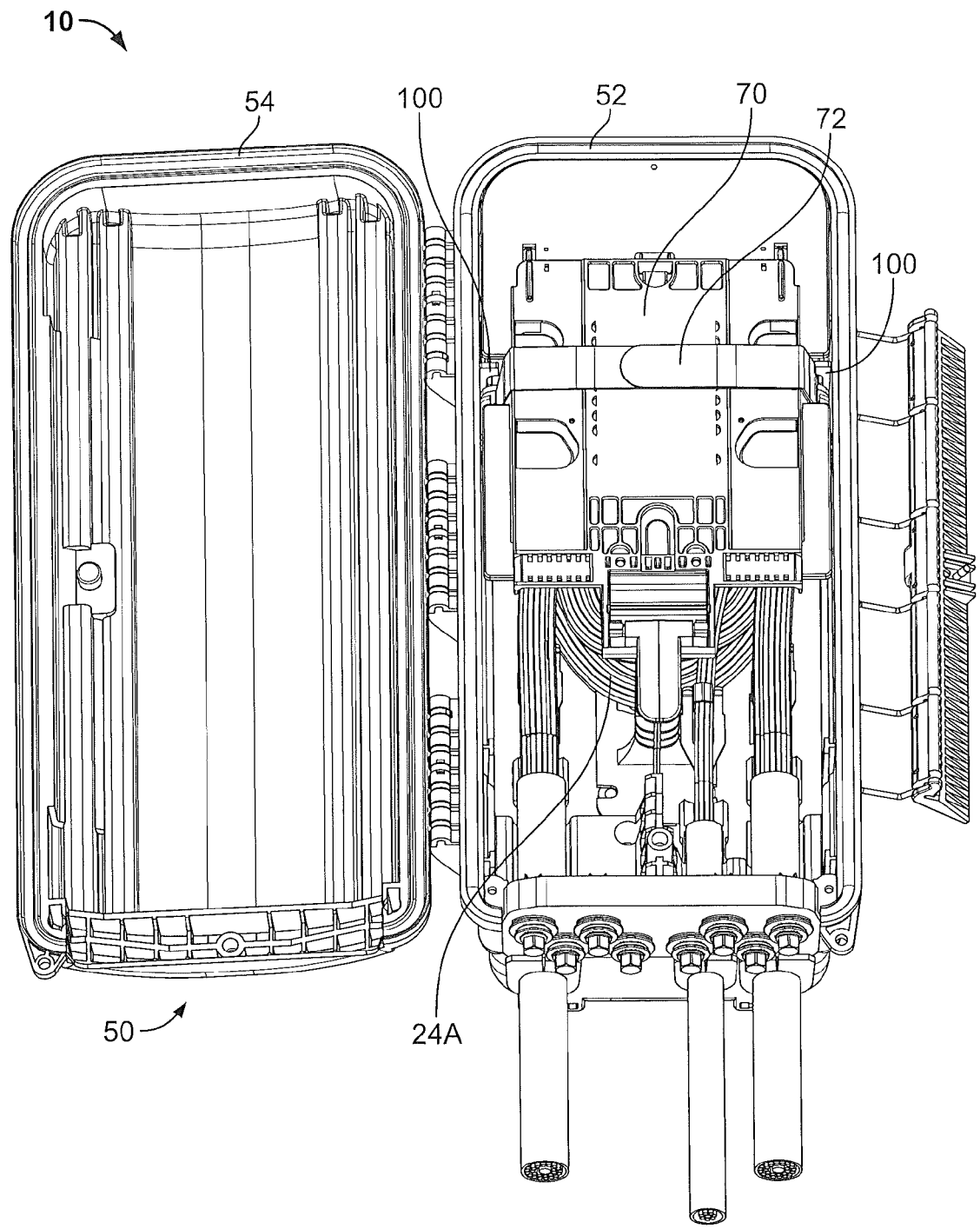

As shown in FIG. 10, the tray or trays 70 (whether containing splices or not) can be laid over the tab members 140 and the slack basket subchamber 60A such that the trays 70 are supported, in whole or in part, by the tab members 140. As shown in FIGS. 2, 3 and 11, the strap 72 can be routed around the trays 70 and through each of the strap slots 156 to lash the trays 70 to the tab assemblies 100.

When it is desired to terminate a branch cable fiber 36 to a fiber 26 of the cable 20, the enclosure housing 50 is opened or retained in the open position to provide access to the tray 70. The branch cable 30 is trimmed and inserted through a cable port 56. The trays 70 are lifted and the tab members 140 are removed from their bases 110 as described above to provide improved access to the slack basket chamber 60A.

The installer can select and sever a corresponding fiber 26 from a selected buffer tube 24 (or ribbon) from the bundle 23. If necessary, the installer cuts the buffer tube 24 to access the fiber. The cut fiber 26 is routed to the branch fiber 36 on the top side of a tray 70 and suitably spliced (e.g., fused or mechanically spliced) to the fiber 36. The splice formed thereby may be mounted in the splice tray 70.

The installer can thereafter replace the coiled bundle 24A in the subchamber 60A, reinstall the tab members 140 into their retaining position, replace the trays 70 and the strap 72, and close the cover 54.

In some cases, the installer may (at the time of the initial installation or subsequently) sever a buffer tube 24 or a fiber 26 and splice the fiber 26 as described above while leaving one or more of the other buffer tubes or fibers of the buffer tube (or ribbon) from which the fiber is separated uncut (i.e., the remaining fibers of the buffer tube or ribbon remain intact and are expressed).

The foregoing procedure can be used to splice additional branch cable fibers 36 to the main cable 20. A fiber or fibers 46 from one or more drop cables 40, or pig tails connected thereto, may be spliced to the cable 20 in similar manner. While the splice is described above with respect to a single fiber, the branch or drop cable may include multiple fibers that may be spliced to multiple ones of the main cable fibers, individually or as a mass splice. Multiple cables may be spliced to the main cable fibers.

Excess lengths of the branch cable 30 and/or the drop cables 40 may also be coiled and stored in the slack basket subchamber 60A.

Figure 12:
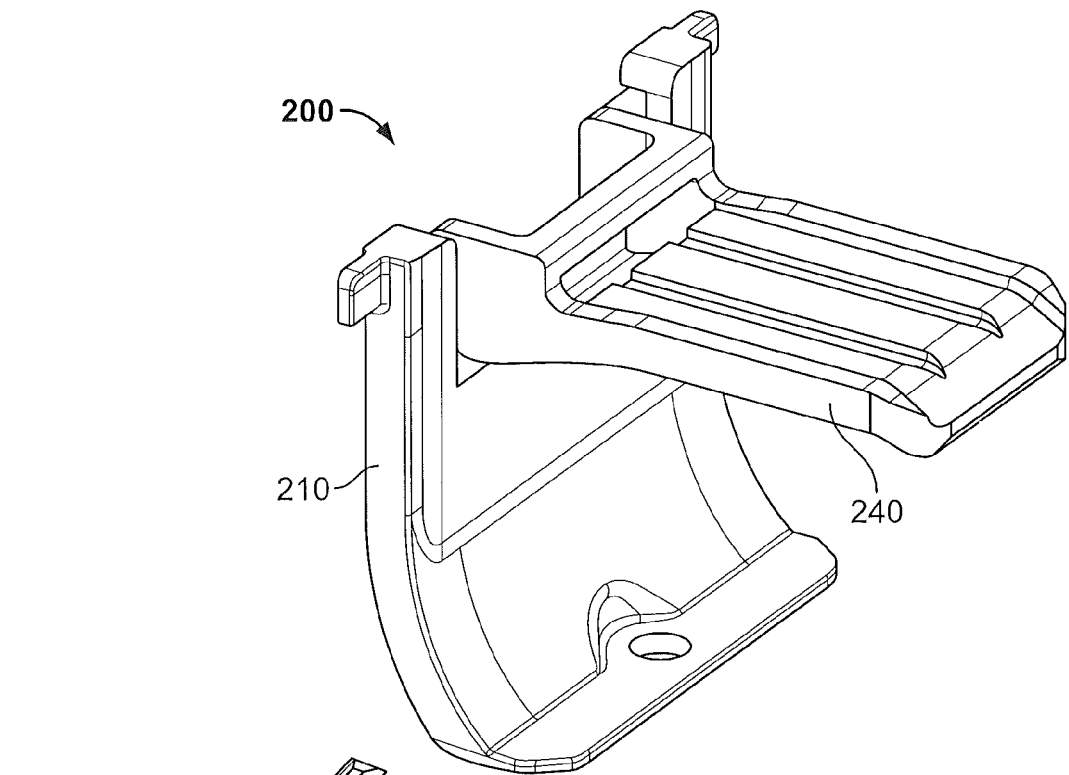
FIG. 12 is a front perspective view of a retainer tab assembly according to further embodiments of the present invention in a retaining position.
Figure 13:
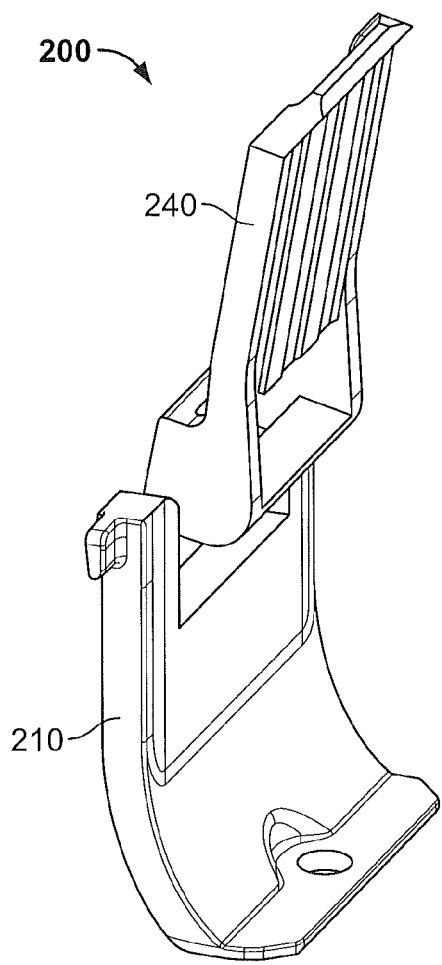
FIG. 13 is a front perspective view of the retainer tab assembly of FIG. 12 in an open position.
Figure 14:
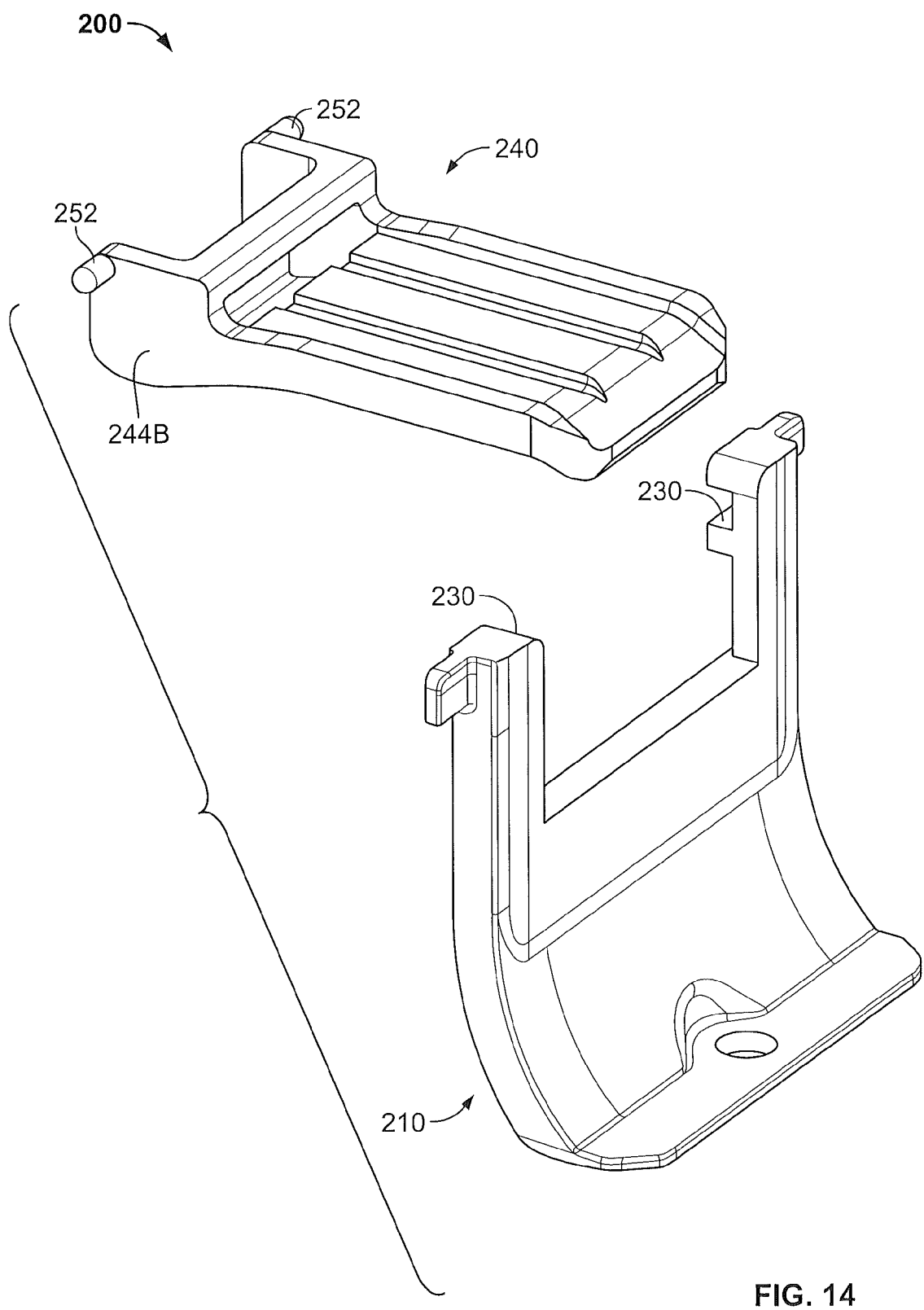
FIG. 14 is an exploded, front perspective view of the retainer tab assembly of FIG. 12.

With reference to FIGS. 12-14, a fiber optic enclosure system according to further embodiments of the present invention will be described. The fiber optic enclosure system can include the enclosure 50 modified with an alternative slack basket system. The fiber optic enclosure system and the enclosure 50 may be constructed and used in the same manner as described herein for the fiber optic enclosure system 10, except as discussed below.

The alternative slack basket system corresponds to and can be used in the same manner as the slack basket system 101, except as follows. The alternative slack basket system includes a pair of hinged retaining tab assemblies 200 in place of the retaining tab assemblies 100. Each tab assembly 200 includes a base 210 and a tab member 240 generally corresponding to the base 110 and the tab member 140. Each base 210 has hinge slots 230 defined on its upper end. Each tab member 240 includes a pair of opposed outwardly extending hinge posts 252 on its mounting end 244B. The hinge posts 252 are pivotally mounted in the hinge slots 230 to form a hinged coupling. The tab member 240 can be pivoted upwardly into an open position as shown in FIG. 13 or down into a retaining position as shown in FIG. 12. The tab assemblies 200 can thereby be used to provide improved access to a slack basket chamber (when in the open position) and to retain a bundle of buffer tubes or ribbons (when in the retaining position).

In some embodiments, the each tab assembly 200 includes a mechanism or feature to releasably secure the tab member 240 in the open position, and/or a mechanism or feature to releasably secure the tab member 240 in the retaining position.

Thus, it can be seen that when the tab members 140, 240 are positioned out of the way in their open positions, the retaining tab assemblies 100, 200 and the corresponding slack basket systems provide more open access to the slack basket subchamber and thereby enable the cables and bundle of optical fibers to be more easily inserted into, removed from, and/or manipulated in the slack basket subchamber. On the other hand, when the tab members 140, 240 are in their retaining positions, they overlap the cables and bundle of optical fibers to reliably retain the cables and bundle in the slack basket subchamber.

The two-piece construction of the tab assemblies 100, 200 can provide significant advantages in manufacture of the enclosure system. By separately molding the bases and tab members and coupling the tab members to the enclosure via the base, it is not necessary to form features in the enclosure base and/or the tab member that would be cost prohibitive or unfeasible. However, it is contemplated that, in some embodiments, the tab members may be directly coupled to the enclosure base.

The illustrated multi-drop enclosure 50 is a butt style enclosure where the main cable 20 enters and exits on a same side of the enclosure 50; however, the slack basket system of the present invention may be used in other types and configurations called enclosures.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A multi-drop closure system for containing and managing a bundle of optical fibers, the multi-drop closure system comprising:
   an enclosure including a cover and a base that collectively define an enclosure chamber, the base including a floor, opposed end walls, and opposed sidewalls, the enclosure chamber including a slack basket chamber to hold the bundle of optical fibers, wherein the cover is hingedly attached to one side of the base for pivotally opening and closing the cover on the base;
   a slack basket system including a plurality of retainer tab assemblies mounted to sidewalls of the enclosure, each retainer tab assembly is constructed with a respective tab member and a respective base member such that both the respective tab member and the respective base member are mounted to the enclosure, the respective tab member being movable between:
      an open position, wherein each tab member is positioned to provide more open access to the slack basket chamber and thereby enable the bundle of optical fibers to be more easily inserted into, removed from, and/or manipulated in the slack basket chamber; and
      a retaining position, wherein each tab member overlaps the slack basket chamber to retain the bundle of optical fibers in the slack basket chamber; wherein each tab member partitions the enclosure chamber into each of the slack basket chamber below each tab member and a tray chamber above each tab member; and
   a plurality of trays pivoting about a pivot axis for each tray such that the plurality of trays pivot vertically on a hinge while mounted in the tray chamber, the pivot axis of each tray being staggered vertically relative to the base, the plurality of trays overlying the slack basket chamber, the plurality of trays being configured to hold optical fiber splices;
   wherein the plurality of trays is supported by at least one tab member; and
   wherein the retainer tab assemblies each include a strap slot therein, and the multi-drop closure system further includes a strap extending over the plurality of trays and through the strap slot to secure the plurality of trays to each retainer tab assembly.

2. The multi-drop closure system of claim 1, wherein each tab member is removable from the enclosure to place each tab member in the open position, and replaceable on the enclosure to place each tab member in the retaining position.

3. The multi-drop closure system of claim 2, wherein the respective base member is secured to the base of the enclosure and each tab member is removable from each base member to place each tab member in the open position and each tab member is replaceable on each base member to place each tab member in the retaining position.

4. The multi-drop closure system of claim 3, wherein the retainer tab assemblies each include a latch mechanism selectively operable to alternately secure each tab member to each base member in the retaining position and release each tab member from each base member in the open position.

5. The multi-drop closure system of claim 3, wherein each tab member is slidably received in each base member to assume the retaining position.

6. The multi-drop closure system of claim 1, wherein each tab member is pivotally coupled to the base member such that each tab member can be alternately pivoted relative to the enclosure into each of the open and closed positions.

7. The multi-drop closure system of claim 6, wherein the base member is secured to the base of the enclosure, and each tab member is pivotally coupled to each base member by a hinge such that each tab member can be alternately pivoted about the hinge into each of the open and closed positions.

8. The multi-drop closure system of claim 6, wherein the retainer tab assemblies each include a latch mechanism selectively operable to alternately secure each tab member in the retaining position and release each tab member to pivot into the open position.

9. The multi-drop closure system of claim 1, wherein each tab member includes a body having a mounting end coupled to the base member and a free end extending over and/or into the slack basket chamber, wherein the base member attaches to the base of the enclosure.

10. The multi-drop closure system of claim 9, wherein each tab member includes an elongate, protruding lip on the free end.

11. The multi-drop closure system of claim 1, further comprising a tray tower secured to the enclosure in the enclosure cavity, wherein the plurality of trays is mounted on the tray tower.

* * * * *